(12) United States Patent
Sobchak et al.

(10) Patent No.: US 7,693,242 B2
(45) Date of Patent: Apr. 6, 2010

(54) DC OFFSET CORRECTION FOR CONSTANT ENVELOPE SIGNALS

(75) Inventors: Charles L. Sobchak, Davie, FL (US); Mahibur Rahman, Lake Worth, FL (US)

(73) Assignee: Freescale Semiconductor, Inc., Austin, TX (US)

( * ) Notice: Subject to any disclaimer, the term of this patent is extended or adjusted under 35 U.S.C. 154(b) by 1150 days.

(21) Appl. No.: 11/151,752

(22) Filed: Jun. 14, 2005

(65) Prior Publication Data

US 2006/0280268 A1 Dec. 14, 2006

(51) Int. Cl.
*H04B 1/10* (2006.01)

(52) U.S. Cl. .................. 375/349; 375/225; 375/219; 375/332; 375/130; 375/343; 327/307; 327/306; 455/63.1; 455/312

(58) Field of Classification Search ............... 375/349, 375/319, 340, 219, 327, 225, 332, 130, 343; 327/306, 307; 455/63.1, 312
See application file for complete search history.

(56) References Cited

U.S. PATENT DOCUMENTS

| | | | |
|---|---|---|---|
| 5,442,655 A * | 8/1995 | Dedic et al. ............... 375/340 |
| 5,920,808 A * | 7/1999 | Jones et al. ............... 455/127.1 |
| 6,240,100 B1 * | 5/2001 | Riordan et al. ............ 370/442 |
| 6,400,778 B1 * | 6/2002 | Matui ...................... 375/319 |
| 6,560,447 B2 | 5/2003 | Rahman et al. |
| 6,606,359 B1 | 8/2003 | Nag et al. |
| 6,856,793 B2 * | 2/2005 | Dunne et al. ............. 455/115.4 |
| 7,035,589 B1 * | 4/2006 | Meng et al. ............... 455/63.1 |
| 2002/0067755 A1 * | 6/2002 | Perkins ..................... 375/130 |
| 2004/0106380 A1 * | 6/2004 | Vassiliou et al. ........... 455/73 |
| 2004/0121735 A1 | 6/2004 | Tseng et al. |
| 2004/0146128 A1 | 7/2004 | Cuje et al. |

* cited by examiner

*Primary Examiner*—Chieh M Fan
*Assistant Examiner*—Eva Y Puente
(74) *Attorney, Agent, or Firm*—Charles W. Bethards (57) ABSTRACT

Methods (1500) and corresponding systems (400, 500) for determining and correcting a DC offset in a receiver operate to sample (1503) a signal to provide complex samples; estimate (1505) a Direct Current (DC) offset corresponding to each of the complex samples, the estimating the DC offset further including solving a plurality of equations relating to the plurality of complex samples, e.g., N simultaneous equations in N samples with a power of the signal invariant across the N samples, to deterministically derive offset values; and then remove (1517) the DC offset from the signal.

17 Claims, 10 Drawing Sheets

DC OFFSET CORRECTION FOR CONSTANT ENVELOPE SIGNALS

FIELD OF THE INVENTION

This invention relates in general to communication equipment and more specifically to techniques and apparatus for determining and correcting for Direct Current (DC) offset in receivers that are arranged and constructed for receiving signals with invariant power, e.g., constant envelope signals, over a relevant time period.

BACKGROUND OF THE INVENTION

Offset issues, such as DC offset in receivers is a known concern that must be dealt with in order for a receiver to operate properly on current systems employing suitable modulation. DC offset may be viewed as a DC error term that ends up added to and as part of a received signal. These error terms can result from various sources, such as a difference between a transmitted frequency and a frequency that the receiver is tuned to. The error terms may also result from various mismatches within a receiver lineup, e.g., mismatches in quadrature mixers or other mismatches in other circuitry such as amplifiers and the like. These mismatches may be more pronounced in receiver lineups that are implemented substantially in integrated circuit form since techniques, such as suitable blocking capacitors, are not readily available to mitigate the DC error terms.

It can also be important to rapidly and accurately determine and correct for these DC offsets in order to minimize signal acquisition times and the like. In many situations, such as relatively low symbol rate modulation, conventional techniques for determining DC offset do not allow for a rapid and accurate determination of DC offset. Conventional techniques generally include evaluating statistical properties, such as an average of the signal. In order to get an accurate estimate these properties may be evaluated over 10s or 100s of symbols. When the symbol duration is long, i.e., symbol rate is low, averaging for a sufficient period of time to insure accuracy does not provide a DC offset determination in the appropriate time frame.

BRIEF DESCRIPTION OF THE DRAWINGS

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION

In overview, the present disclosure concerns communication equipment, e.g., fixed equipment, mobile or portable devices, and more specifically techniques and apparatus for determining and correcting for Direct Current (DC) offset in receivers that are arranged and constructed for receiving signals with a constant envelope at least over a given time period. More particularly various inventive concepts and principles embodied in methods and apparatus, e.g. communication devices, systems and estimators, and integrated circuits, for determining, estimating, or correcting for a DC offset will be discussed and disclosed.

The communication equipment or devices of particular interest may vary widely but include handsets, messaging devices and other equipment that include a receiver for facilitating wireless connectivity. Such receivers are subject to DC offsets do to various non ideal elements and component matches. In systems, equipment and devices that employ a signal having an invariant power or envelope (amplitude) during a known time, e.g., signals with constant envelope modulation at least over a known time period, DC offset apparatus and methods can be particularly advantageously utilized, provided they are practiced in accordance with the inventive concepts and principles as taught herein.

The instant disclosure is provided to further explain in an enabling fashion the best modes, at the time of the application, of making and using various embodiments in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms, if any, such as first and second, top and bottom, and the like are used solely to distinguish one from another entity or action without necessarily requiring or implying any actual such relationship or order between such entities or actions.

Much of the inventive functionality and many of the inventive principles are best implemented with or in integrated circuits (ICs) including possibly application specific ICs or ICs with integrated processing controlled by embedded software or firmware. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts according to the present invention, further discussion of such software and ICs, if any, will be limited to the essentials with respect to the principles and concepts of the various embodiments.

Figure 1:
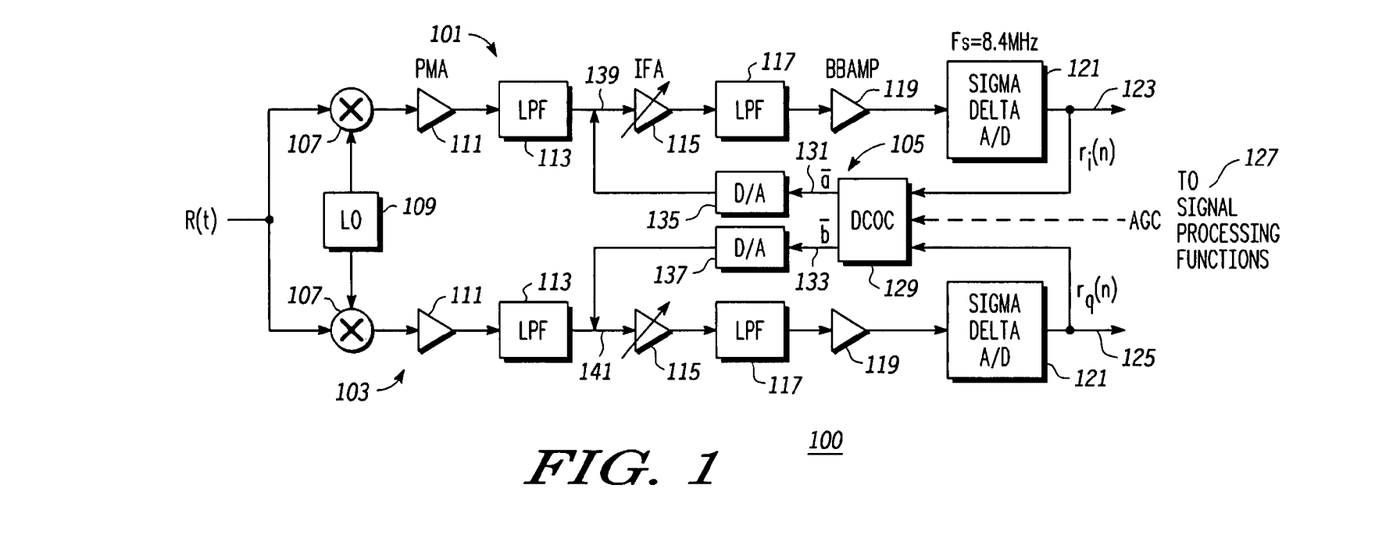
FIG. 1 depicts in a simplified and representative form, a high level diagram of a portion of a receiver including a Direct Current (DC) offset determination and correction system in accordance with one or more embodiments.

Referring to FIG. 1, a simplified and representative high level diagram of a portion of a receiver 100 including a Direct Current (DC) offset determination and correction system in accordance with one or more embodiments will be briefly discussed and described. In FIG. 1, a receiver backend including a in-phase or real (I) path 101, a quadrature or imaginary (Q) path 103, and DC offset system 105 is shown. Generally the basic receiver functions for the I path 101 and the Q path 103 are known.

A received signal R(t), i.e., signal from an antenna that has been amplified and possibly filtered, is coupled to a mixer 107 (typically referred to as a quadrature mixer) that is driven by a local oscillator 109 (one output phase shifted by 90 degrees) to provide an I and Q signal to a post mixer amplifier 111. The post mixer amplifier 111 is coupled to a filter 113, e.g., a low pass filter with 100 KHz bandwidth or the like, with the filter coupled to an Intermediate Frequency (IF) amplifier 115 that is shown with variable gain. The gain of the IF amplifier 115 is normally controlled by an automatic gain control (AGC) system (not specifically shown). The IF amplifier 115 is coupled to another filter 117 and from there to a base band amplifier 119.

The outputs of the base band amplifiers 119 drive respective Analog to Digital converters (ADC) 121, to provide I samples $r_i(n)$ at the output 123 and Q samples $r_q(n)$ at the output 125. In some embodiments the ADC can be a sigma delta based ADC operating, for example, to provide 6 bit samples at an 8.4 MHz rate. The ADC functions as is known have a finite dynamic range and for many receiver applications must provide significant output resolution over a relatively large signal amplitude range. Thus any DC offset at the input to the ADC 121 can detract from the dynamic range or otherwise contribute to non linear performance. Thus the DC offset normally must be mitigated in some form.

In any event, the I and Q samples are coupled to further signal processing functions 127, such as demodulation, decoding, and the like that are not relevant to this disclosure. These samples are also coupled to the DC offset system 105, specifically a DC offset estimator 129, optionally together with AGC information for the samples. The DC offset estimator and possibly other supporting functions provides a DC offset signal at 131 for the I path and at 133 for the Q path. In some embodiments this is a digital signal that is then applied to, respective, I and Q Digital to Analog converters (DAC) 135, 137. The DACs provide an analog signal that is indicative of the DC offset as translated, for example, to the input of the IF amplifiers 115. The respective I and Q DC offset can be subtracted from the signal at summing points 139, 141 in a known manner.

Figure 2:
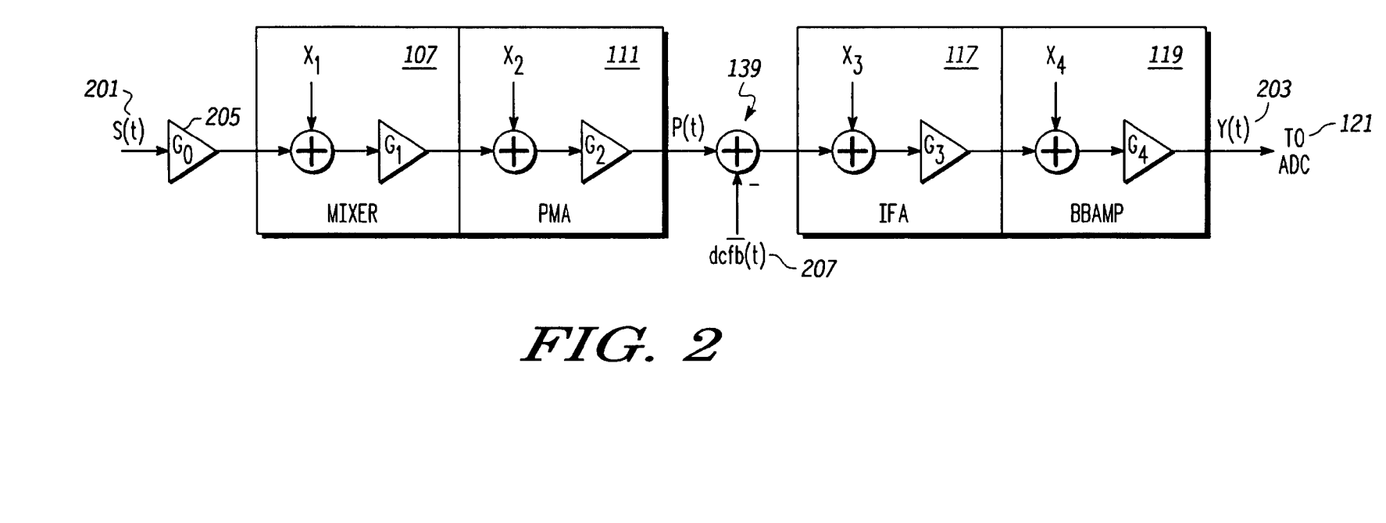
FIG. 2 in a representative form, shows a diagram of a model of a portion of the receiver of FIG. 1 that illustrates DC offset issues.

Referring to FIG. 2, a representative diagram of a model of a portion of the receiver of FIG. 1 that illustrates DC offset issues or concerns will be briefly discussed and described. FIG. 2 represents a model of either the I or Q path gains and offsets and is specifically shown in the context of the I path. FIG. 2 shows an input signal S(t) 201 that produces an output signal Y(t) 203. Note that Y(t) 203 is the input signal to ADC 121. Each of the mixer 107, post mixer amplifier 111, IF amplifier 117 and Base band amplifier 119 are modeled by a corresponding offset Xa and gain Ga, a=1-4. The summing point 139 is shown with a DC feedback signal 207 subtracted from the signal P(t), i.e., S(t) at this point in the lineup. Those of ordinary skill will appreciate that Y(t) 203 may be expressed as:

$$Y(t) = S(t)G_0G_1G_2G_3G_4 + X_1G_1G_2G_3G_4 + X_2G_2G_3G_4 + X_3G_3G_4 + X_4G_4$$

assuming that the DC feedback signal 207 is ignored or is zero.

In typical embodiments or lineups as little as 2.5 millivolt DC offset (X2) at the post mixer amplifier 111 can result in a DC offset at the input to the ADC 121 in excess of 300 millivolts. This does not take into account any DC offset contributed by the mixer 107, IF amplifier 115 or Baseband amplifier 119. Furthermore the dynamic range of the ADC 121 may be as little as 600 millivolts peak to peak depending on bias levels and the like. Thus it may be required to compensate for the DC offset in order to insure appropriate remaining dynamic range of the ADC and it is also important that the DC offset be detected and corrected as quickly as possible in order to acquire signals, etc. The DC feedback signal 207 (alternatively referred to as DC offset or DC offset signal) that is applied should be appropriate to mitigate or cancel the offset terms (X1 ..., X2 ..., X3 ..., X4 ...) in the above equation. In some situations, e.g., lower symbol rate systems, traditional averaging techniques may not allow the DC offset to be determined quickly enough. For example in Wideband Code Division Multiple Access systems the chip rate is 3.86 Million chips per second, where as other systems may have symbol rates in the 3.2 Kilo symbols per second range. However, as will be further discussed below, if the signal power or amplitude is known to be constant or invariant over a sufficient number of samples the DC offset can be advantageously determined in an accurate and rapid manner.

Figure 3:
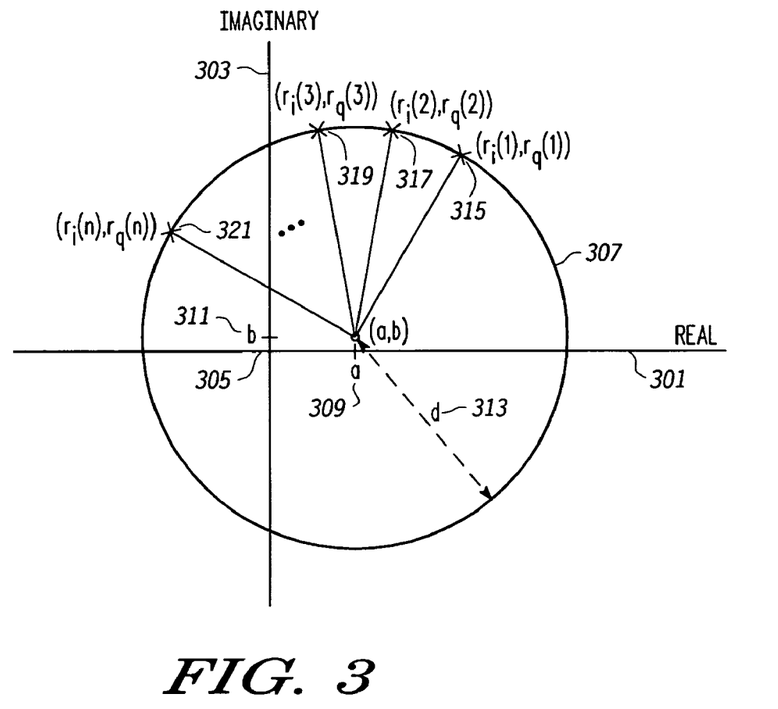
FIG. 3 depicts a representative diagram of a complex signal including a DC offset.

Referring to FIG. 3, a representative diagram of a complex signal including a DC offset will be discussed and described. FIG. 3 shows a complex plane with a real or in-phase (I) axis 301 and an imaginary or quadrature (Q) axis 303. A signal with "0" DC offset where the power is not varying would be represented by a circle centered at the origin 305 with a radius corresponding to the envelope amplitude or power of the signal. The signal depicted is represented by the circle 307 that is centered at a DC offset represented by the coordinates a 309 on the real axis and b 311 on the imaginary axis. The radius of this circle, although not known, may be represented by d 313. A first, second, third, through nth sample 315, 317, 319, ..., 321 and corresponding I and Q coordinates is depicted. Note that all samples lie on the circle 307 as a result of the power or envelope of the signal being invariant during the time period required to obtain the samples. The objective is to determine a 309 and b 311 and correct for this offset as quickly as possible.

The distances between the center of the constellation or circle and the samples or sample coordinates of the wave form may be expressed by the following equations, respectively, EQN1-EQN4.

$$d^2(1) = (r_i(1) - a)^2 + (r_q(1) - b)^2$$

$$d^2(2) = (r_i(2) - a)^2 + (r_q(2) - b)^2$$

$$d^2(3) = (r_i(3) - a)^2 + (r_q(3) - b)^2$$

$$d^2(n) = (r_i(n) - a)^2 + (r_q(n) - b)^2$$

where d(1) is the distance to the first sample coordinates, etc.

Given a constant envelope or power signal (note this also assumes that the over-sampling frequency or sampling frequency of the ADC in FIG. 1 is sufficiently faster than any fading rate which will normally be true for practical systems) the distances from the center of the constellation to the coordinates of the samples are all equal, i.e.: EQ. 5

$$d^2(1)=d^2(2)=d^2(3)=d^2(n)$$

From this, only 3 samples result in 3 equations with 3 unknowns and then these equations can be solved for the dc offset −a and b). Note: in reality we could use only 2 equations but we would need knowledge of the input signal's magnitude (and/or frequency) (i.e. if we were inputting a known test or training sinusoid we would know input magnitude and also the phase rotation between samples and thus would only need 2 equations). So this method will work with a known or an unknown tone frequency. If we are in strong signal conditions and if the sampling frequency, fs, is fast enough 3 samples may likely be sufficient $$\Gamma = (r_i(2)-r_i(1))(r_i^2(2)-r_i^2(3)+r_q^2(2)-r_q^2(3))-(r_i^2(2)-r_i^2(1)+r_q^2(2)-r_q^2(1))(r_i(2)-r_i(3))$$

to measure the dc offset. Under weaker signal conditions (sensitivity) we can average n samples, or use a closed loop feedback system to slowly track out the dc.

Setting EQN1 equal to EQN2 we have the following:

$$(r_i(1)-a)^2+(r_q(1)-b)^2=(r_i(2)-a)^2+(r_q(2)-b)^2$$

Now solving for the real part of the dc offset, a:

$$r_i^2(1)-2r_i(1)a+a^2+r_q^2(1)-2r_q(1)b+b^2-(r_i^2(2)-2r_i(2)a+a^2+r_q^2(2)-2r_q(2)b+b^2)=0$$

$$r_i^2(1)-2r_i(1)a+r_q^2(1)-2r_q(1)b-r_i^2(2)+2r_i(2)a-r_q^2(2)+2r_q(2)b=0$$

Substituting EQN 1 into EQN 2 results in the following (EQN6):

$$2a(r_i(2)-r_i(1))=r_i^2(2)-r_i^2(1)+r_q^2(2)-r_q^2(1)+2b(r_q(1)-r_q(2))$$

and EQN7 (EQN 3 substituted into EQN 2):

$$2a(r_i(2)-r_i(3))=r_i^2(2)-r_i^2(3)+r_q^2(2)-r_q^2(3)+2b(r_q(3)-r_q(2))$$

Solving for the real part of the dc offset, a, in EQN6:

$$a = \frac{r_i^2(2)-r_i^2(1)+r_q^2(2)-r_q^2(1)+2b(r_q(1)-r_q(2))}{2(r_i(2)-r_i(1))}$$

Now substituting a into EQN7 above:

$$2\frac{r_i^2(2)-r_i^2(1)+r_q^2(2)-r_q^2(1)+2b(r_q(1)-r_q(2))}{2(r_i(2)-r_i(1))}$$

$$(r_i(2)-r_i(3)) = r_i^2(2)-r_i^2(3)+r_q^2(2)-r_q^2(3)+2b(r_q(3)-r_q(2))$$

and solving for b, the imaginary part, of the dc offset:

$$2b(r_q(1)-r_q(2))(r_i(2)-r_i(3))-2b(r_q(3)-r_q(2))(r_i(2)-r_i(1))=\Gamma$$

$$\Gamma = (r_i(2)-r_i(1))(r_i^2(2)-r_i^2(3)+r_q^2(2)-r_q^2(3))-(r_i^2(2)-r_i^2(1)+r_q^2(2)-r_q^2(1))(r_i(2)-r_i(3))$$

and thus b is given by:

$$b = \frac{(r_i(2)-r_i(1))(r_i^2(2)-r_i^2(3)+r_q^2(2)-r_q^2(3))-(r_i^2(2)-r_i^2(1)+r_q^2(2)-r_q^2(1))(r_i(2)-r_i(3))}{2(r_q(1)-r_q(2))(r_i(2)-r_i(3))-2(r_q(3)-r_q(2))(r_i(2)-r_i(1))}$$

The previous equations can be simplified or rewritten in terms of the following 6 equations. Thus a DC offset determination or estimate may be provided in accordance with the following equations as each new sample is processed. Note as suggested by FIG. 1 the I squared and Q squared values may be provided by the AGC since these parameters are normally calculated by that function. The simplified equations are:

$$i2i1 = r_i(2)-r_i(1)$$

$$i2i3 = r_i(2)-r_i(3)$$

$$q1q2 = (r_q(1)-r_q(2))$$

$$q3q2 = (r_q(3)-r_q(2))$$

$$M = r_i^2(2)-r_i^2(1)+r_q^2(2)-r_q^2(1)$$

$$N = r_i^2(2)-r_i^2(3)+r_q^2(2)-r_q^2(3)$$

These results of the above equations can be combined to yield b, a as follows:

$$b = \frac{(i2i1)(N)-(i2i3)(M)}{2(q1q2)(i2i3)-2(q3q2)(i2i1)}$$

and:

$$a = \frac{M+2b(q1q2)}{2(i2i1)}$$

Note that the majority of the calculations required to evaluate the above equations and thus derive a, b are additions and subtractions, however a divider function will be required one time for each equation. The divider function could likely be resource shared with any other divider requirement since the DC offset calculation does not need many samples to have an accurate measurement.

Figure 4:
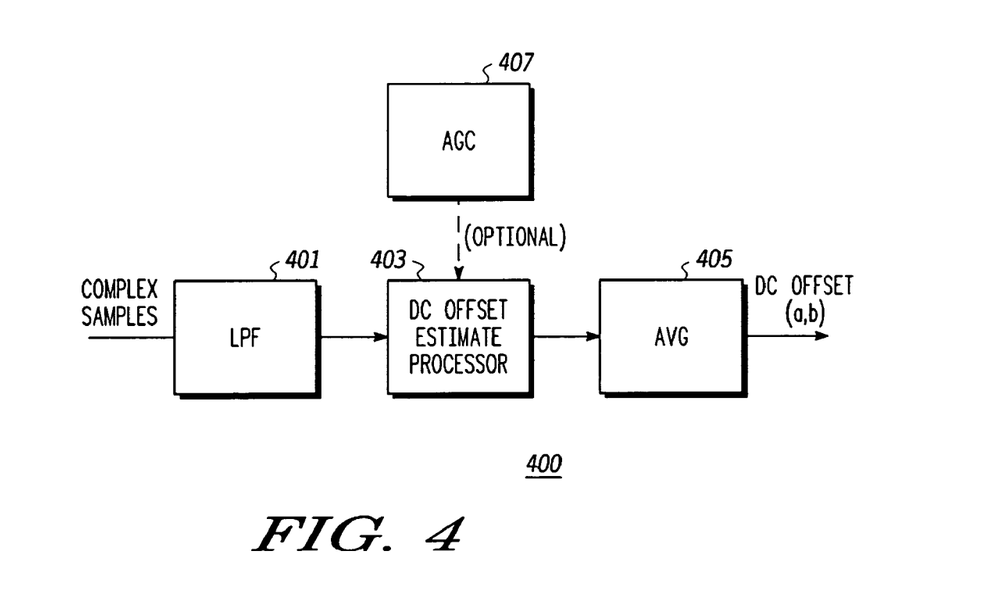
FIG. 4 depicts a representative high level DC offset system in accordance with one or more embodiments.

Referring to FIG. 4, a representative high level DC offset system in accordance with one or more embodiments will be discussed and described. FIG. 4 illustrates a system 400 that is arranged and configured to determine a Direct Current (DC) offset corresponding to a signal in a receiver. The system includes an input or input section, e.g., low pass filters 401, that is configured to receive a plurality of complex samples of a signal, e.g., as provided from the ADC 121 of FIG. 1. The filters 401 will remove high frequency components of the ADC processes as is known. Further included is a processing circuitry (alternatively referred to herein as a processor) 403 that is configured to estimate the DC offset corresponding to each of the complex samples by solving a plurality of equations relating to the plurality of complex samples to derive a first offset value (a, b) corresponding to the DC offset. Additionally included is an output or output section 405, e.g., an averaging function, etc., that is configured to provide the DC offset to the receiver. An AGC function 407 may be relied upon to provide the square of the I and Q samples to the processor 403 as noted earlier. It is noted that the processing circuitry or processor may be implemented in hardware or a general purpose processor or digital signal processor executing instructions from firmware or other memory or various combinations of one or more of these alternatives.

In various embodiments as noted above where the signal is a constant envelope signal (at least over the time duration of the complex samples), the processor 403 solves N simultaneous equations with N variables, the N variables corresponding to N complex samples, where N in some embodiments is 3 or more. Advantageously, the processor can solve equations in accordance with those noted above to obtain a, b. In various exemplary embodiments, the processor repeats, e.g., with each new sample or the like, the estimate of the DC offset to provide a plurality of first offset values and the output section 405, specifically the averaging function, is configured to average at least a portion of the plurality of first offset values to provide the DC offset. These concepts will be discussed below in further detail.

Figure 5:
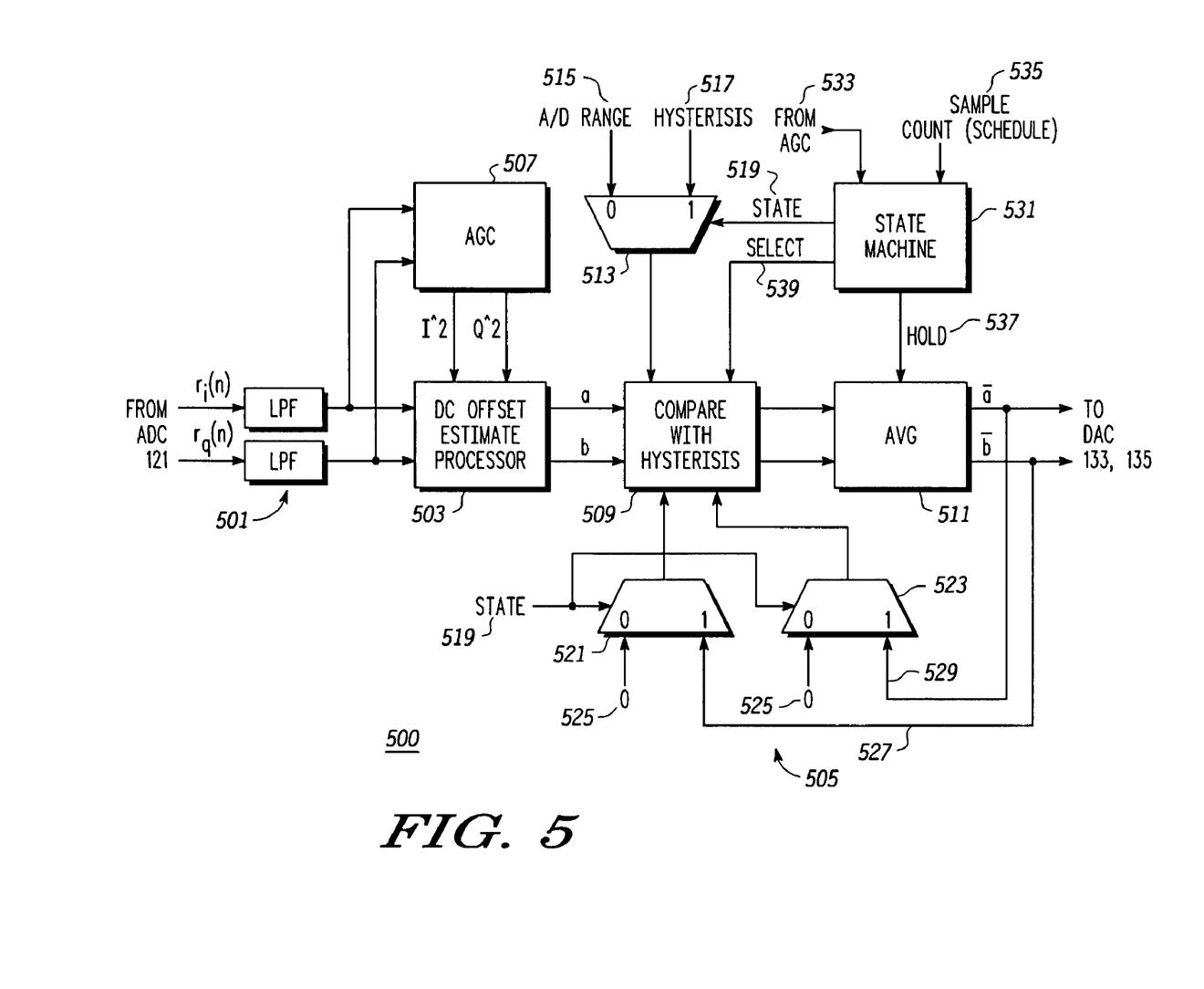
FIG. 5 depicts a more detailed diagram of a DC offset estimation system in accordance with one or more embodiments.

Referring to FIG. 5, a more detailed diagram of a DC offset estimation system in accordance with one or more embodiments will be described and discussed. FIG. 5 illustrates a system 500 that is similar to the system 400 of FIG. 4 but with a different output section 505 including additional detail and a state machine 531 for controlling overall operation of the system. Similar to FIG. 4, the system 500 of FIG. 5 is arranged and configured as a DC offset estimator and thus to determine or calculate a Direct Current (DC) offset corresponding to a signal in a receiver. The system of DC offset estimator includes an input 501 or input section, e.g., low pass filters, that is configured to receive a plurality of complex samples (real and imaginary samples) of a signal. These samples, $r_i(n)$, $r_q(n)$, are provided by or received from the ADC 121. The low pass filters remove noise contributed by the analog portions of the receiver, sampling noise, interferences, and the like as will be appreciated and can have a bandwidth similar to the bandwidth of the desired signal (so as to preserve the desired signal but also to remove as much noise and interferences as possible). In some embodiments the low pass filter can be a simple Infinite Impulse Response (IIR) filter with a 20 kHz bandwidth. The samples of the signal as filtered will, in some embodiments, be supplied to an AGC 507 and in any event will be supplied to processing circuitry (alternatively referred to as a processor) 503.

The processor 503, similar to the processor of FIG. 4, is configured to estimate the DC offset corresponding to each of the complex samples by solving a plurality of equations relating to the plurality of complex samples to derive a first offset value, e.g., a, b, corresponding to the DC offset. Note that the offset value is deterministically derived and in some embodiments where the signal is a constant envelope signal at least across the samples, the processor solves N simultaneous equations with N variables, where the N variables corresponds to N complex samples. It is possible to solve the equations as discussed above where N>1, e.g., N=2, however certain embodiments use N>2 or specifically N=3. Note that this means that N samples must be acquired before an offset value that is legitimate or valid can be calculated or utilized.

In one or more exemplary embodiments the processor repeats the estimate of the DC offset, e.g., with one or more new samples, to provide a plurality of first offset values. The offset value or plurality of offset values or corresponding real (a) and imaginary (b) terms are provided to an output 505 or output section that is configured to provide the DC offset to the receiver via for example the DAC(s) 133, 135. Specifically, the a and b offset values are coupled to a comparator 509 and from there to an averaging function 511. The averaging function 511 is configured to average at least a portion of the plurality of first offset values to provide the DC offset. The averaging function as is known can be a low pass filter that may be implemented as an Infinite Impulse Response or Finite Impulse Response filter. Furthermore, where the processor repeats the estimate of the DC offset to provide a plurality of first offset values, the comparator is configured to compare each of the plurality of first offset values to a corresponding threshold and discard or alternatively clip or otherwise limit, e.g. to the corresponding threshold, any of the plurality of first offset values that fail the comparing. Note that discarding an offset value amounts to not passing the offset value along. In the alternative a value equivalent to the threshold or other predetermined value (offset value as limited or clipped) may be passed along if the offset value fails the comparison. Additional operational and structural details will be further discussed below.

The comparator is shown coupled to a multiplexer 513 that selects a threshold or limit, e.g., ADC range 515 or a hysteresis value 517 according to whether state signal 519 selects state "0" or state "1". The comparator is also coupled to a multiplexer 521 that selects between "0" 525 and the real DC offset 527 (a bar from the averaging function 511) according to whether state signal 519 selects state "0" or state "1". Similarly the comparator is coupled to a multiplexer 523 that selects between "0" 525 and the imaginary DC offset (b bar from the averaging function 511) according to whether state signal 519 selects state "0" or state "1". A state machine 531 obtains an AGC input 533 from the AGC 507 and a sample count 535 (i.e., schedule) and generates the state signal 519, a select signal 539 (selects between discarding or clipping) that is coupled to the comparator 509, and a hold signal 537 where the hold signal is coupled to the averaging function 511. The AGC input 533 will indicate when any significant changes occur in receiver settings, e.g., IF amplifier gain changes, a signal becomes available, or the like. The sample count 535 can be obtained from the ADC clock and may be used to develop or as a scheduling entity by the state machine 531 as will become evident given the additional discussions below.

Essentially the comparator 509 and associated functions removes or alternatively limits or clips offset estimates that are "obviously" in error. Erroneous offset estimates may result from transients or other noise like perturbations in the receiver. Note that the number of erroneous estimates can be reduced by decreasing the over-sampling frequency (which moves the samples farther apart). Initially before the averaging function has accurate data, e.g., after initial power up, a gain change, or signal acquisition, the comparator will use, thus not discard, any offset values a, b, that fall within the range of the ADC (i.e. the state will be set to "0" so that the offset value comparison will be with +/−Vp or ½ of the sigma delta peak to peak dynamic range). Once the output of the averaging function 511 has enough samples its output can be fed back into the comparator 509 along with the hysteresis value 517 (i.e. the state will be set to "1"). The magnitude of the offset value is compared with the corresponding hysteresis value 517 and if the offset value is less than or within the hysteresis value it will be added to the corresponding averaging function output and otherwise will either be discarded or clipped to the hysteresis value according to the selection signal value. Note this is the offset value at the ADC input after one or more corrections have been made and thus may be referred to as a residual offset value. Thus the state machine as coupled to the comparator is arranged to facilitate the comparator so as to compare one or more of the plurality of offset values to a first threshold (Vp) and a different one or more of the plurality of first offset values to a second threshold (+/− the hysteresis value). The state machine is responsive to a periodic schedule or a change in gain settings for the receiver to select between the first threshold and the second threshold and control when an update to the DC offset is performed. Thus with the comparator and supporting functions as above discussed, the averaging function averages the plurality of first offset values other than any of the plurality of first offset values that have been discarded to provide the DC offset.

Note: also the AGC power estimate can be fed into the dc offset algorithm or the comparator to also help determine which dc offset estimates are in error (not shown). It is important to note that for cases where a known test sinusoid or it is known that a strong signal will be present, the system of FIG. 4 may be used to track out, correct for or mitigate the dc offset. A significant benefit for this new apparatus and techniques is that they rapidly and accurately measure or determine DC offset regardless of input signal strength (which isn't the case for traditional methods).

Figure 6:
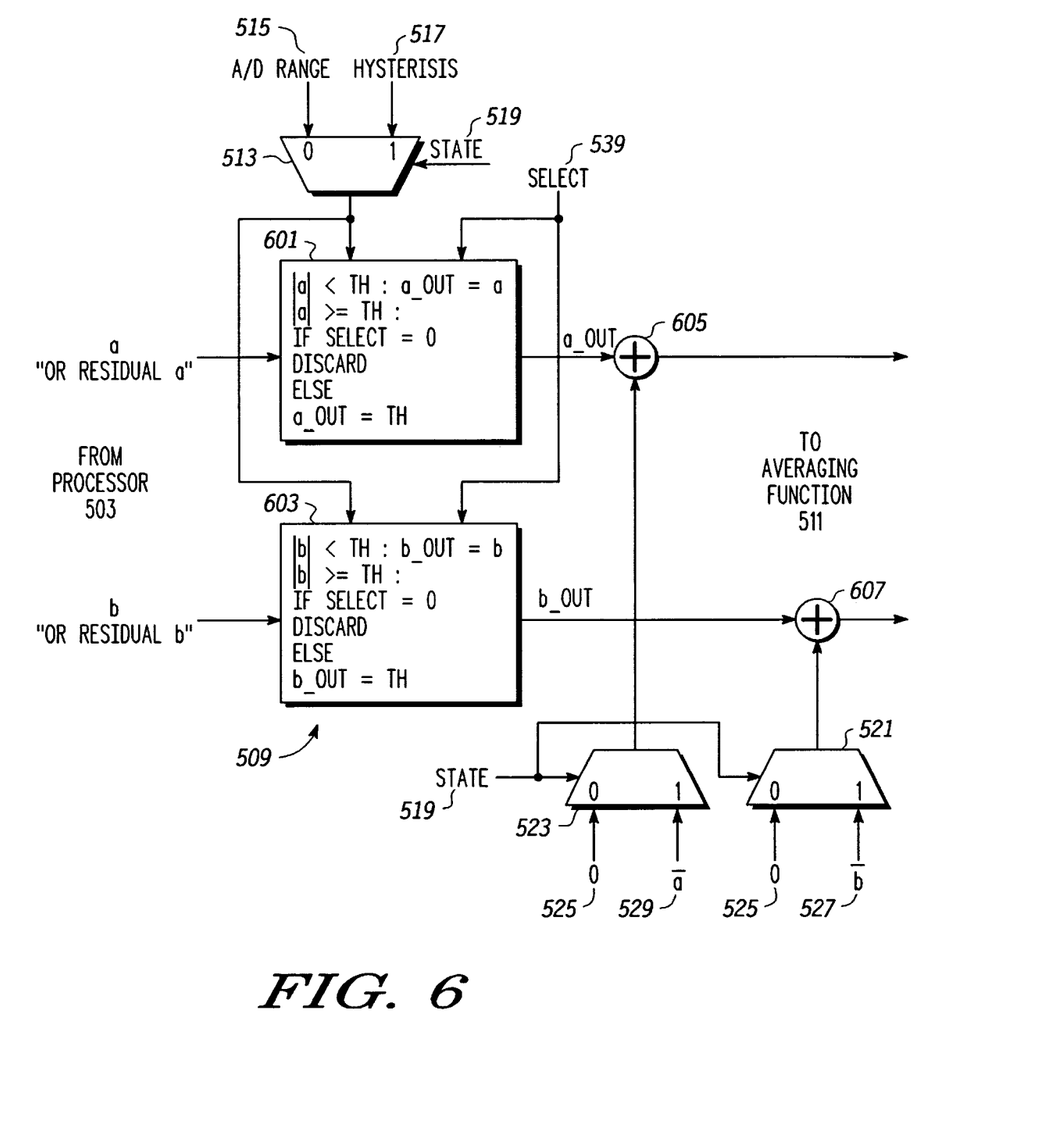
FIG. 6 illustrates additional detail for a portion of the DC offset estimation system of FIG. 5 in accordance with one or more embodiments.

Referring to FIG. 6, additional detail for a comparator portion of the DC offset estimation system of FIG. 5 in accordance with one or more embodiments will be discussed and described. The real offset value a, from the processor 503 is coupled to a first comparator 601 where the magnitude of a is compared to a corresponding threshold and passed along to an adder 605, e.g., if the magnitude of a is less than the threshold. Alternatively as determined by the select signal 539, if the magnitude of a is greater than or equal to the threshold, a may be limited or clipped at for example the threshold value and this clipped or limited a is passed along to the adder. When the selection bit is in state "0" the DC offset value will be discarded and when the selection bit is in state "1" the DC offset value will be clipped to the threshold value (either ADC range or hysteresis value). The threshold is selected or determined as noted above in accordance with the state signal 519. If the offset value a or a clipped value of a is passed along, it is added to "0" or the averaging function output (a bar) 529 depending on the state signal 519. Typically the state machine will set the select signal to "0", however in some instances, e.g., correction of a large DC offset rapidly it can be useful to set the signal to "1" and thus speed up acquisition.

Similarly, the imaginary offset value b from the processor 503 is coupled to a second comparator 603 where the magnitude of b is compared to a corresponding threshold and passed along to an adder 607, e.g., if the magnitude of b is less than the threshold. Alternatively as determined by the select signal 539, if the magnitude of b is greater than or equal to the threshold, b may be limited or clipped at, for example, the threshold value and this clipped or limited b is passed along to the adder. If the offset value b or clipped b is passed along, it is added to "0" or the averaging function output (b bar) 527 depending on the state signal 519.

Figure 7:
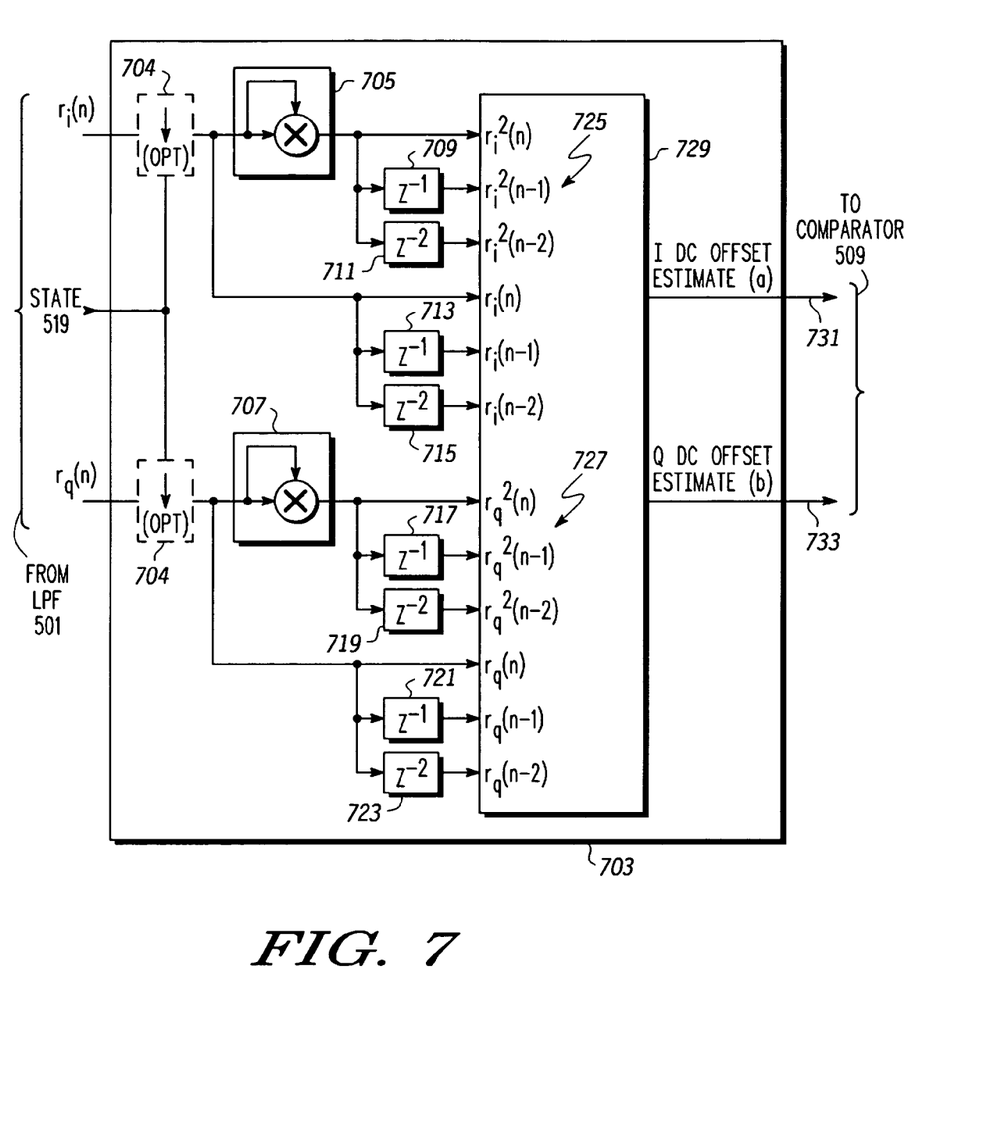
FIG. 7 illustrates additional detail for another portion of the DC offset estimation system of FIG. 5 in accordance with one or more embodiments.

Referring to FIG. 7, additional detail for a processor portion 703 of the DC offset estimation system of FIG. 5 in accordance with one or more embodiments will be discussed and described. The real and imaginary samples $r_i(n)$, $r_q(n)$ from the low pass filters 501 are, optionally and respectively, coupled to down samplers 704 controlled, e.g., by the state signal 519. The outputs from the optional down samplers 704 or alternatively the real and imaginary samples are coupled to a squaring function 705, 707 (note the squaring function can be provided by an AGC system) with the output of the squaring functions 705, 707, respectively, coupled to a single delay stage 709, 717 and a double delay stage 711, 719. The real and imaginary samples of the signal or alternatively the outputs from the down samplers are also coupled, respectively, to a single delay stage 713, 721 and a double delay stage 715, 723.

Thus $r_i(n)$, $r_i(n-1)$, $r_i(n-2)$ and their respective squares 725 as well as $r_q(n)$, $r_q(n-1)$, $r_q(n-2)$ and their respective squares 727 are coupled to an arithmetic processor 729. The arithmetic processor 729 can solve the equations discussed earlier to provide the real offset value or estimate (a) at 731 and imaginary offset value or estimate (b) at 733. These estimates or values are then provided to the comparator 509.

The down samplers 704, if provided, essentially allow a bandwidth for the system of FIG. 4 or FIG. 5 to be changed from a high bandwidth (fast response, possibly error susceptible) mode to a lower bandwidth mode. For example the down samplers can drop or discard every other, nine out of ten, etc. samples and thus effectively narrow the loop bandwidth of the DC offset correction systems or methods. It may be desirable in certain signal conditions to modify this bandwidth. It may be appropriate to use a large bandwidth for initial DC offset estimates and a lower bandwidth for normal tracking purposes. Note that the processor 729 can accomplish the same ends by simply ignoring some samples and there corresponding squares. Note also that there is no requirement for sequential samples or periodic samples. All that is needed is enough independent samples to solve the independent equations, e.g., three samples in some embodiments.

Figure 8:
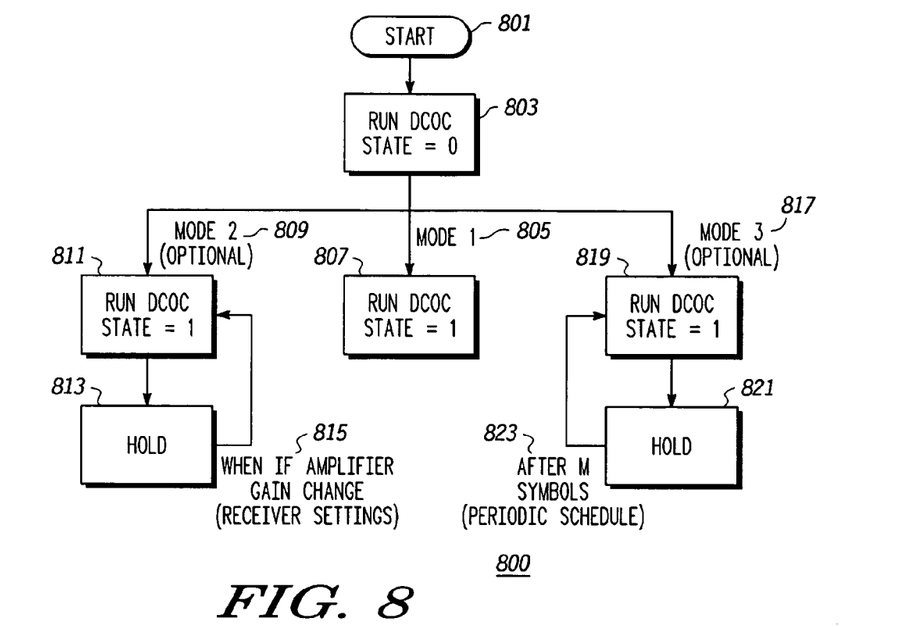
FIG. 8 shows a flow chart of processes executed by a state machine that may be used in conjunction with the FIG. 5 system in accordance with one or more embodiments.

Referring to FIG. 8, a flow chart of exemplary processes executed by state machine 531 that may be used in conjunction with the FIG. 5 system in accordance with one or more embodiments will be discussed and described. After starting at 801 the DC offset calculation or correction is run in state "0" 803. Thus any offset values that exceed the dynamic range of the ADC are discarded. Once relatively stable offset values have been obtained and a legitimate averaging function output has been obtained the DC offset calculation or correction can be run in state "1", e.g., mode 1 805 as shown at 807. Alternatively or optionally the DC offset determination can be run in mode 2 809 or mode 3 817. In mode 2 the DC offset determination is run in state "1" 811 with the result held (via hold signal 537 and averaging function 511) until a receiver setting, e.g., IF amplifier gain, changes 815 and then 811 is repeated. In mode 3 817, the DC offset correction is run in state "1" 819 with the result held 821 for M samples or symbols 823 and then 819 is repeated. Note the number of samples or times the DC offset calculation is run in state "0" versus in state "1" and the value of M will vary with the specifics of the signal and modulation thereof and may have associated tradeoffs. One of ordinary skill can experimentally determine specific values given the teachings herein.

As a brief review, a Direct Current (DC) offset estimator or system that is arranged and configured to calculate a DC offset in a signal has been discussed and described. In various exemplary embodiments, the DC offset estimator includes an input that is configured to receive real and imaginary samples of a signal; a processor that is configured to estimate the DC offset corresponding to each of the complex samples by solving N simultaneous equations with N variables to derive a first offset value corresponding to the DC offset, where the N variables correspond to N complex samples with N greater than 1 and the power of the signal is invariant across the samples of the signal; and an output configured to provide the DC offset. The input can further comprise low pass filters to filter the real and imaginary samples of the signal, a squaring function coupled to the low pass filter and configured to provide the square of the real and imaginary samples of the signal, and a plurality of delay stages coupled between the low pass filter and the processor. An averaging function configured to average at least a portion of a plurality of offset values to provide the DC offset can also be included. Some embodiments further include a comparator that is configured to compare each of a plurality of offset values to a corresponding threshold and discard or clip (limit) any of the plurality of first offset values that exceed the corresponding threshold.

It will be appreciated that the above described functions and structures may be implemented in one or more integrated circuits. For example, many or all of the functions can be implemented in the signal processing circuitry that is suggested by FIG. 1

Referring to FIG. 9 through FIG. 14 various simulated performance data for a DC offset estimator in accordance with one or more embodiments as compared to a known or traditional DC offset estimator will be discussed and described. The plots of FIG. 9 through FIG. 14 show results for two methods of dc offset correction 1) the traditional signal averaging method and 2) the deterministic derivation techniques as discussed above. The plots show the dc offset correction for a Continuous Phase Frequency Shift Keying (8CPFSK) modulation at 3200 symbols per second under various conditions.

The typical method of dc offset correction uses a low pass filter (to remove the dc offset) followed by additional averaging. The results for typical signal conditions with the inventive techniques can be improved by decreasing the over-sampling frequency (8.4 Msps, e.g., by down sampling or ignoring a portion of the sample; however a decrease in over-sampling has an extremely bad effect when using traditional methods. To keep the comparison fair and the plots or graphs simple to understand the same sampling frequency is used for both cases. Even under these higher sampling frequency conditions improved results over typical methods are dramatic and easy to see.

Figure 9:
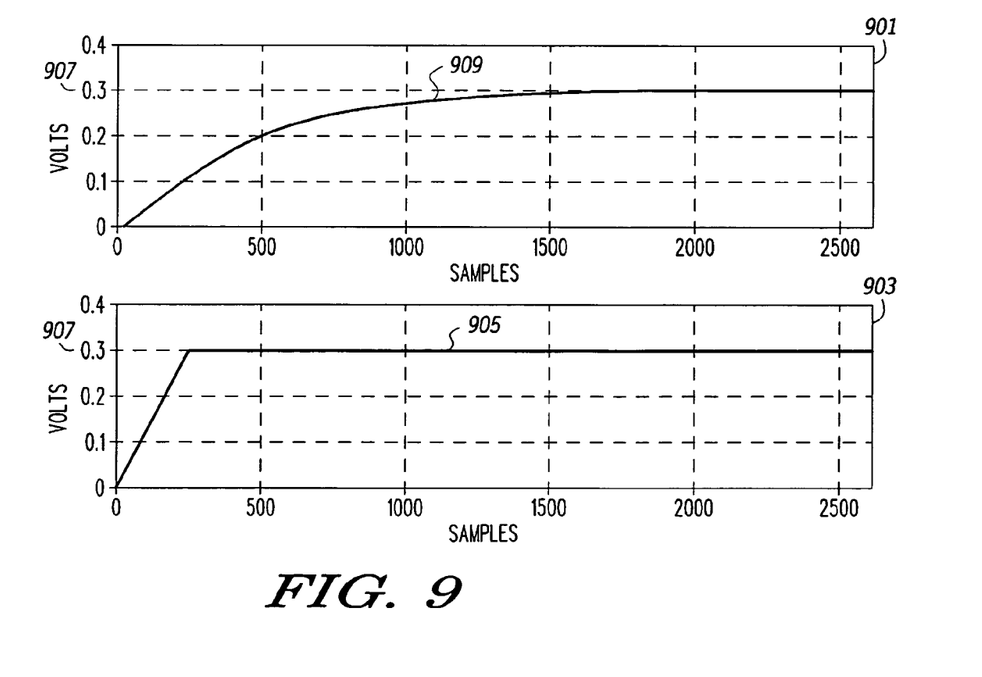
FIG. 9 through FIG. 14 show various simulated performance data for a DC offset estimator in accordance with one or more embodiments as compared to a known DC offset estimator.
Figure 10:
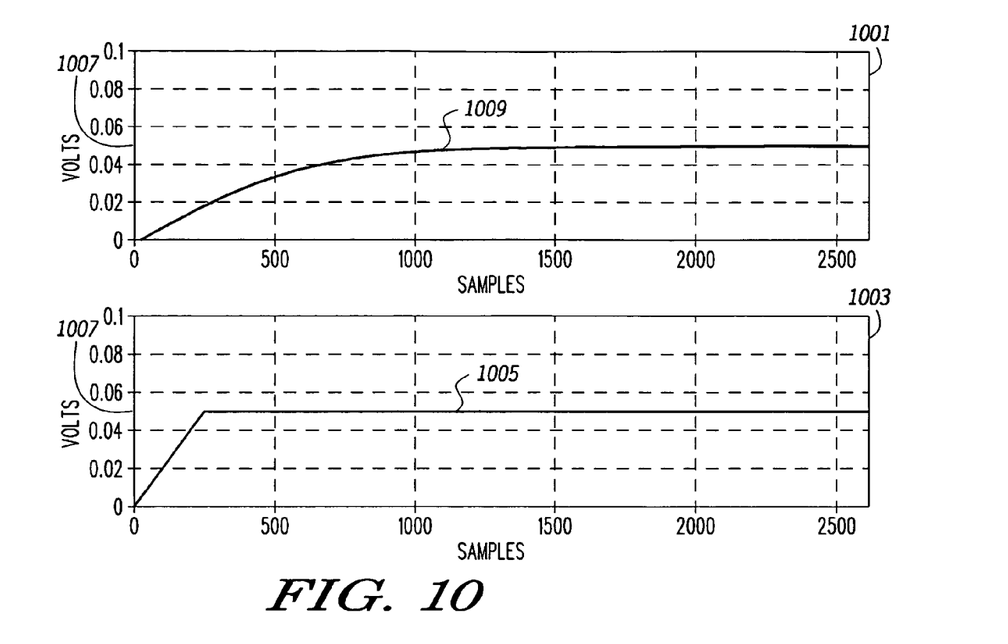

FIG. 9 and FIG. 10 show a weak signal situation (SNR<5 dB with dc offsets of 300 mV and 50 mV, respectively). In this instance, the Signal to Noise Ratio (SNR) is below sensitivity. FIG. 9 has a dc offset of 300 mV and FIG. 10 has a dc offset of 50 mV. Also note the top plot in all of these FIGs uses the traditional averaging method to measure the dc offset and the second or lower plot uses the deterministic calculation techniques as discussed and described herein. FIG. 9 shows two graphs 901, 903 each spanning 2500 samples. The graph 903 shows a line 905 that is representative of how quickly and accurately the deterministic calculation approach determines that the DC offset (300 mv) 907 as compared to graph 901 and line 909 for the traditional approach. FIG. 10 shows corresponding graphs 1001 and 1003 with a line 1005 that represents the deterministic approach reaching the DC offset (50 mv) 1007 as compared to the traditional approach represented by line 1009.

Figure 11:
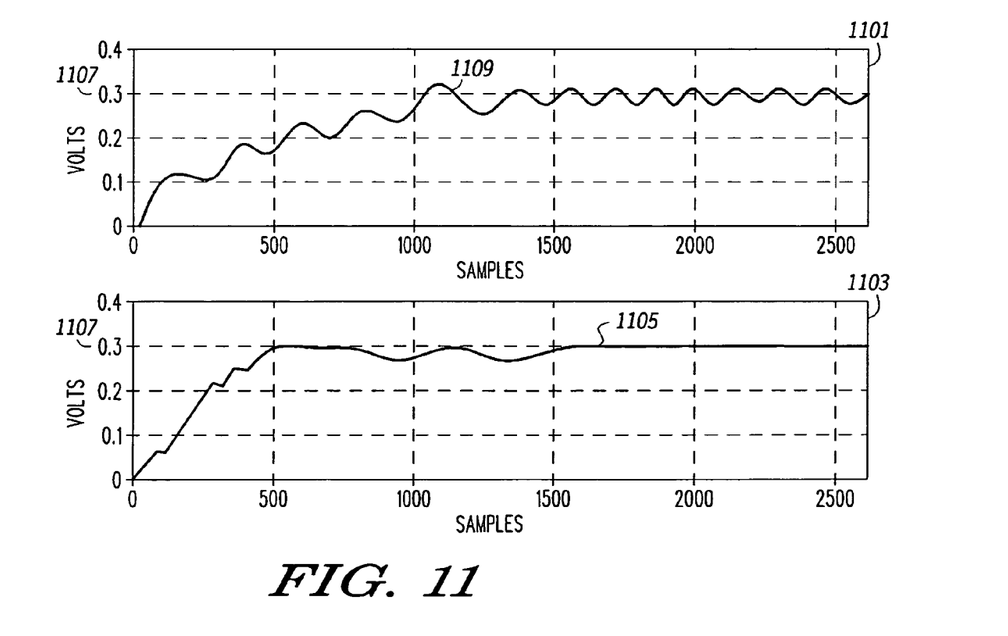
Figure 12:
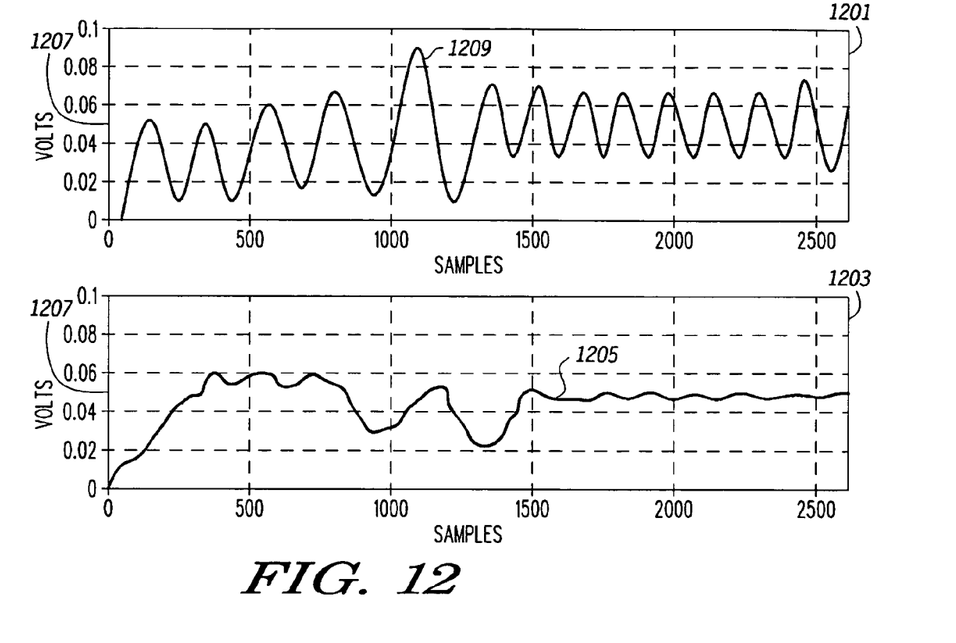

FIG. 11 and FIG. 12 show typical signal conditions with SNR between 5 and 30 dB for DC offsets of 300 mV and 50 mV, respectively. FIG. 11 shows two graphs 1101 and 1103, each again spanning 2500 samples. The graph 1103 shows a line 1105 that represents the speed and accuracy with which the deterministic approach reaches the DC offset 1107 (300 mv) as compared to the traditional averaging approach represented by line 1109. FIG. 12 shows corresponding graphs 1201 and 1203 with a line 1205 that represents the deterministic approach reaching the DC offset (50 mv) 1207 as compared to the traditional approach represented by line 1209.

Figure 13:
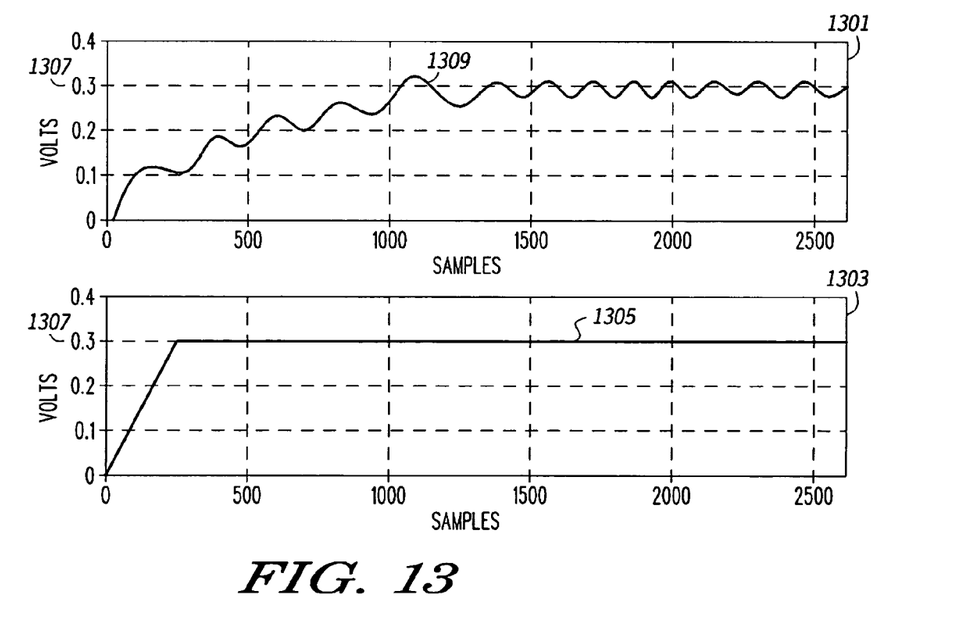
Figure 14:
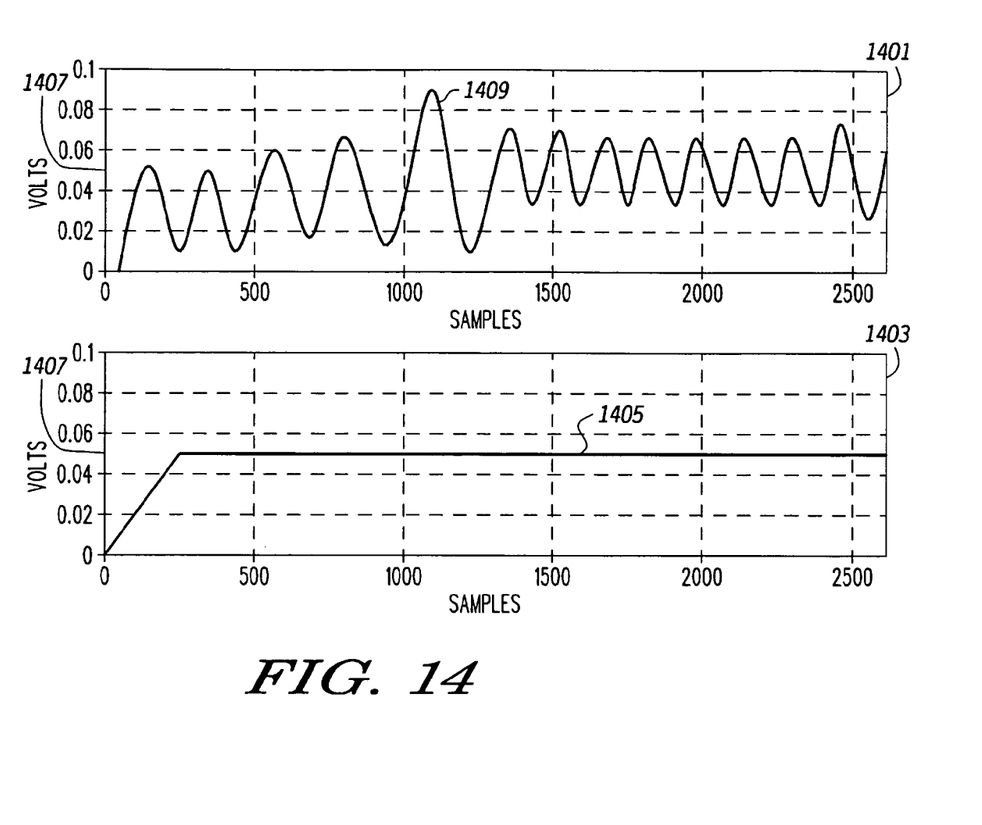

FIG. 13 and FIG. 14 show a strong signal condition (SNR>30 dB) with DC offset of 300 mV and 50 mV, respectively. FIG. 13 shows two graphs 1301 and 1303, each again spanning 2500 samples. The graph 1303 shows a line 1305 that represents the speed and accuracy with which the deterministic approach reaches the DC offset 1307 (300 mv) as compared to the traditional averaging approach represented by line 1309. FIG. 14 shows corresponding graphs 1401 and 1403 with a line 1405 that represents the deterministic approach reaching the DC offset (50 mv) 1407 as compared to the traditional approach represented by line 1409.

As can be seen from the plots, not only is the track time greatly reduced in all cases when using the deterministic approach but the average error is also greatly reduced. For these simulations the track time for the traditional method was 3 symbols where as for the inventive techniques the track time is less than ½ symbol. Thus these techniques can measure the dc offset of a constant envelope signal very rapidly. Traditional methods are not aware of the modulation scheme and require that the receive signal be weaker than the noise and normally take too long to track out or mitigate a DC offset under realistic scenarios since the settings for the traditional algorithms can not assume that there is no signal (or at least a very weak signal) present.

Figure 15:
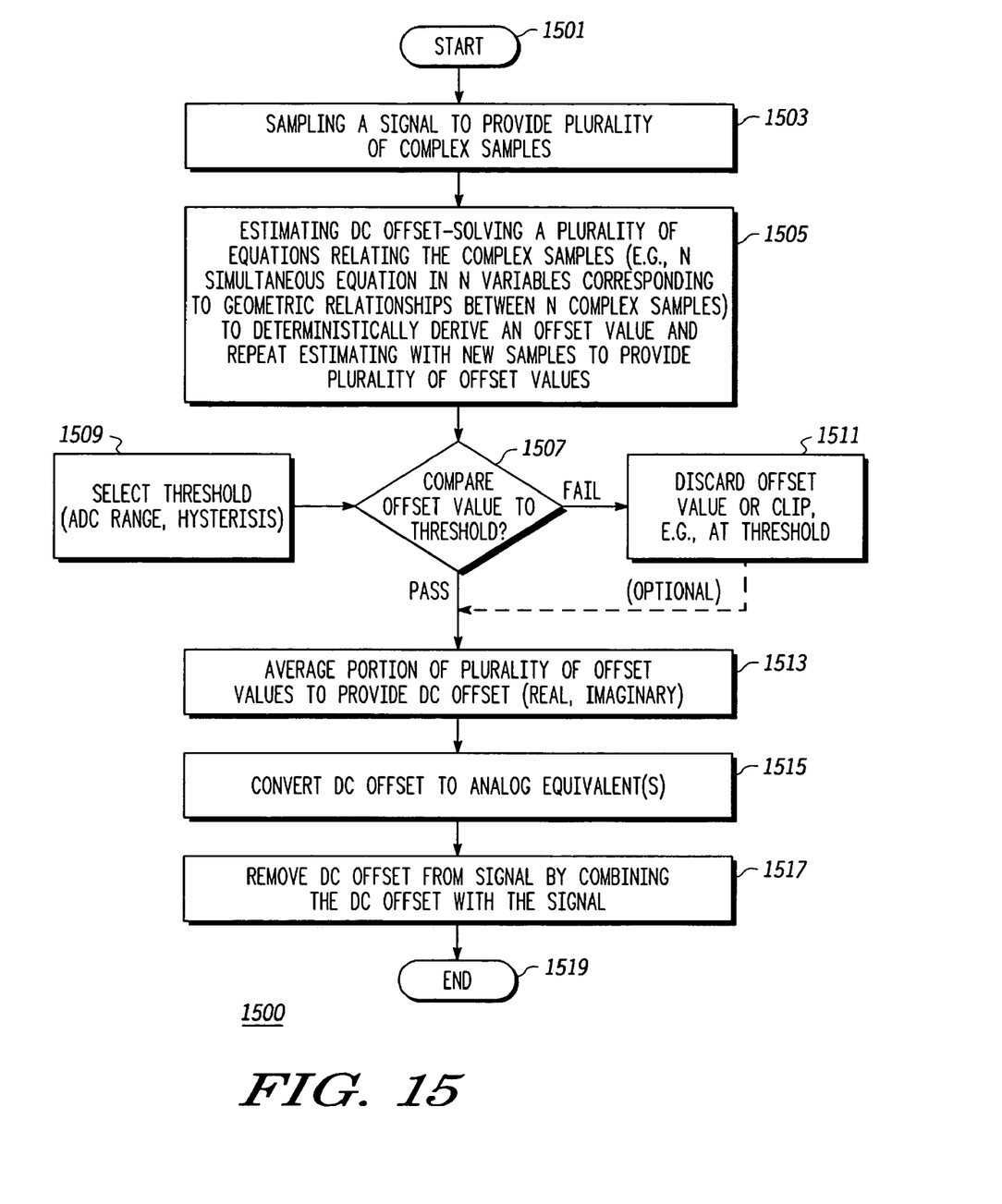
FIG. 15 shows a flow chart illustrating representative embodiments of a method of offset correction in a receiver in accordance with one or more embodiments.

Referring to FIG. 15 a representative embodiment of a method of offset correction in a receiver in accordance with one or more embodiments will be discussed and described. It will be appreciated that this method uses many of the inventive concepts and principles discussed in detail above and thus this description will be somewhat in the nature of a summary with various details generally available in the earlier descriptions. This method can be implemented in one or more of the structures or apparatus described earlier or other similarly configured and arranged structures. FIG. 15 shows an embodiment of a method 1500 of determining and correcting for an offset, e.g., DC offset, in a receiver. The method 1500 begins at 1501 and then at 1503 shows sampling a signal to provide a plurality of complex samples.

The method then includes estimating 1505 a Direct Current (DC) offset corresponding to each of the complex samples, where the estimating the DC offset further includes solving a plurality of equations relating to the plurality of complex samples to deterministically derive an offset value. In one or more embodiments the solving the plurality of equations further comprises presuming that a power of the signal is invariant across the plurality of complex samples. In some embodiments the solving the plurality of equations further comprises solving N simultaneous equations with N variables, the N variables corresponding to N complex samples and the N simultaneous equations corresponding to geometric relationships between the N variables. Note that the estimating can be repeated to provide a plurality of first offset values. At least a portion of the plurality of first offset values can be averaged to provide the DC offset.

Given the plurality of offset values, the method 1500 in one or more embodiments further comprises comparing 1507 each of the plurality of offset values to a corresponding threshold as selected 1509 from, e.g., an ADC range or hysteresis value, and discarding 1511 or clipping or otherwise limiting any of the plurality of first offset values that fail the comparing. Thus different offset values can be compared to different thresholds as described in detail earlier. For the offset values (complex values) that pass the comparison 1507 and optionally those that have been limited or clipped at 1511, the method 1500 further comprises averaging 1513 the plurality of offset values other than any of the plurality of offset values that have been discarded to thus provide the DC offset. The method further includes removing the DC offset from the signal by first converting 1515 the DC offset as calculated to an analog equivalent and then removing 1517 the DC offset from the signal by combining (subtracting) the DC offset with the signal for both a real and imaginary path. The method ends at 1519 but may be repeated as needed. Note that the estimating the DC offset can further include performing a first estimate of the DC offset and then a second estimate to update the first estimate, where the second estimate is performed in accordance with at least one of a periodic schedule and a change in settings for the receiver, e.g., under control of the state machine.

The processes, apparatus, and systems, discussed above, and the inventive principles thereof are intended to and can alleviate DC offset determination and mitigation issues caused by prior art techniques. Using these principles of deterministically deriving or calculating an offset value by solving N equations in N variables corresponding to N samples given an assumption that power over the samples is invariant can quickly yield an accurate estimate of DC offset with relatively minimal costs and the like.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A method of offset correction in a receiver, the method comprising:
    sampling a signal provided by the receiver to provide a plurality of complex samples;
    estimating a Direct Current (DC) offset corresponding to each of the complex samples, the estimating the DC offset further including solving a plurality of equations relating to the plurality of complex samples referenced to a real offset and an imaginary offset to deterministically derive a first offset value; and
    removing the DC offset from the signal,
    wherein the estimating is repeated to provide a plurality of first offset values and the method further comprises comparing each of the plurality of first offset values to a corresponding threshold and discarding or limiting any of the plurality of first offset values that fail the comparing.

2. The method of claim 1 wherein the solving the plurality of equations further comprises presuming that a power of the signal is invariant across the plurality of complex samples.

3. The method of claim 1 wherein the salving the plurality of equations further comprises solving N simultaneous equations with N variables, the N variables corresponding to N complex samples and the N simultaneous equations corresponding to geometric relationships between the N variables, where N is equal to or greater than three (3).

4. The method of claim 1 wherein the estimating is repeated to provide a plurality of first offset values and the method further comprises averaging at least a portion of the plurality of first offset values to provide the DC offset.

5. The method of claim 1 wherein the comparing each of the plurality of first offset values to a corresponding threshold further comprises comparing one or more of the plurality of first offset values to a first threshold and a different one or more of the plurality of first offset values to a second threshold.

6. The method of claim 1 wherein the method further comprises averaging the plurality of first offset values other than any of the plurality of first offset values that have been discarded to provide the DC offset.

7. The method of claim 1 wherein the estimating the DC offset further comprises performing a first estimate of the DC offset and then a second estimate to update the first estimate, the second estimate performed in accordance with at least one of a periodic schedule and a change in settings for the receiver.

8. A system arranged and configured to determine a Direct Current (DC) offset in a receiver, the system comprising:
    an input configured to receive a plurality of complex samples of a signal;
    a processing circuitry configured to estimate the DC offset corresponding to each of the complex samples by solving a plurality of equations relating to the plurality of complex samples referenced to a real offset and an imaginary offset to derive a first offset value corresponding to the DC offset; and
    an output configured to provide the DC offset to the receiver,
    wherein the processing circuitry repeats the estimate of the DC offset to provide a plurality of first offset values and the system further comprises a comparator configured to compare each of the plurality of first offset values to a corresponding threshold and discard or clip at the corresponding threshold any of the plurality of first offset values that fail the comparing.

9. The system of claim 8 wherein the signal is a constant envelope signal and the processing circuitry solves N simultaneous equations with N variables, the N variables corresponding to N complex samples.

10. The system of claim 8 wherein the processing circuitry repeats the estimate of the DC offset to provide a plurality of first offset values and the system further comprises an averaging function configured to average at least a portion of the plurality of first offset values to provide the DC offset.

11. The system of claim 8 further comprising an averaging function configured to average the plurality of first offset values other than any of the plurality of first offset values that have been discarded to provide the DC offset.

12. The system of claim 8 further comprising a state machine coupled to the comparator and arranged to facilitate the comparator so as to compare one or more of the plurality of first offset values to a first threshold and a different one or more of the plurality of first offset values to a second threshold.

13. The system of claim 12 wherein the state machine is responsive to at least one of a periodic schedule and a change in gain settings for the receiver to select between the first threshold and the second threshold and control when an update to the DC offset is performed.

14. The system of claim 8 wherein the processing circuitry is further configured to receive an automatic gain control signal representative of a power corresponding to each of the plurality of complex samples and the output further comprises a digital to analog converter (DAC) for converting a digital version of the DC offset to an analog signal.

15. A Direct Current (DC) offset estimator arranged and configured to calculate a DC offset in a signal, the DC offset estimator comprising:
    an input configured to receive complex samples comprising real and imaginary samples of a signal;

a processing circuitry configured to estimate the DC offset corresponding to each of the complex samples by solving N simultaneous equations with N variables referenced to a real offset and an imaginary offset to derive a first offset value corresponding to the DC offset, the N variables corresponding to N complex samples, where N is greater than 1 and the power of the signal is invariant across the samples of the signal;

an output configured to provide the DC offset, and a comparator configured to compare each of a plurality of first offset values to a corresponding threshold and discard or clip at the corresponding threshold any of the plurality of first offset values that exceed the corresponding threshold.

16. The DC offset estimator of claim 15 wherein the input further comprises low pass filters to filter the real and imaginary samples of the signal, a squaring function coupled to the low pass filter and configured to provide the square of the real and imaginary samples of the signal, and a plurality of delay stages coupled between the low pass filter and the processor.

17. The DC offset estimator of claim 15 further comprising an averaging function configured to average at least a portion of a plurality of first offset values to provide the DC offset.

* * * * *

UNITED STATES PATENT AND TRADEMARK OFFICE
CERTIFICATE OF CORRECTION

PATENT NO. : 7,693,242 B2
APPLICATION NO. : 11/151752
DATED : April 6, 2010
INVENTOR(S) : Sochak et al.

It is certified that error appears in the above-identified patent and that said Letters Patent is hereby corrected as shown below:

Column 13 line 55 please delete "salving" and insert --solving--

Signed and Sealed this

Twenty-fourth Day of August, 2010

David J. Kappos
*Director of the United States Patent and Trademark Office*